May 25, 1965   A. H. MARLER   3,185,515

HANDLES

Filed Jan. 8, 1963   2 Sheets-Sheet 1

INVENTOR.
Arnold H. Marler
BY
Harness, Dickey & Pierce
ATTORNEYS.

May 25, 1965  A. H. MARLER  3,185,515

HANDLES

Filed Jan. 8, 1963  2 Sheets-Sheet 2

INVENTOR.
Arnold H. Marler
BY
Harness, Dickey & Pierce
ATTORNEYS.

United States Patent Office 3,185,515
Patented May 25, 1965

3,185,515
HANDLES
Arnold H. Marler, 8 Wendell Ave.,
Weston, Ontario, Canada
Filed Jan. 8, 1963, Ser. No. 250,117
3 Claims. (Cl. 294—27)

This invention relates to handles and, more particularly, to a handle which may be readily attached to and detached from conventional milk cartons and the like.

One important object of this invention is to provide a device of this type which is so reduced in the number and character of its component parts as to approach the ultimate in structural simplicity and whereby the device may be conveniently made of a suitable plastic material by molding.

Another object of the invention is to provide a device of this type wherein the structural simplicity of the handle creates an economy in its manufacture and maintenance.

Another object of this invention is to provide a handle of the class described which is easily attached to a carton and is readily detached therefrom.

Still another object is to provide a handle device of this character provided with simple but effective means for quickly securing the device to a carton whereby accidental disengagement from the carton is prevented.

The various objects and advantages and the novel details of construction of two commercially practical embodiments of the invention will become more apparent as this description proceeds, especially when considered in connection with the accompanying drawings, in which.

This invention relates to handles and, more especially, to a handle which may be readily attached to and detached from conventional milk cartons and the like.

Figure 1:
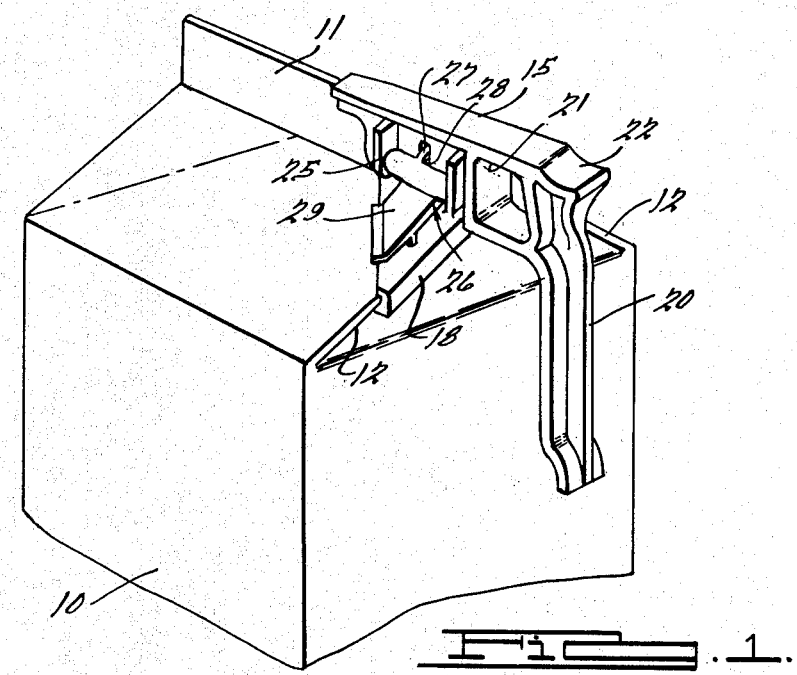
FIGURE 1 is a perspective view showing the handle device of this invention attached to a conventional milk carton.
Figure 2:
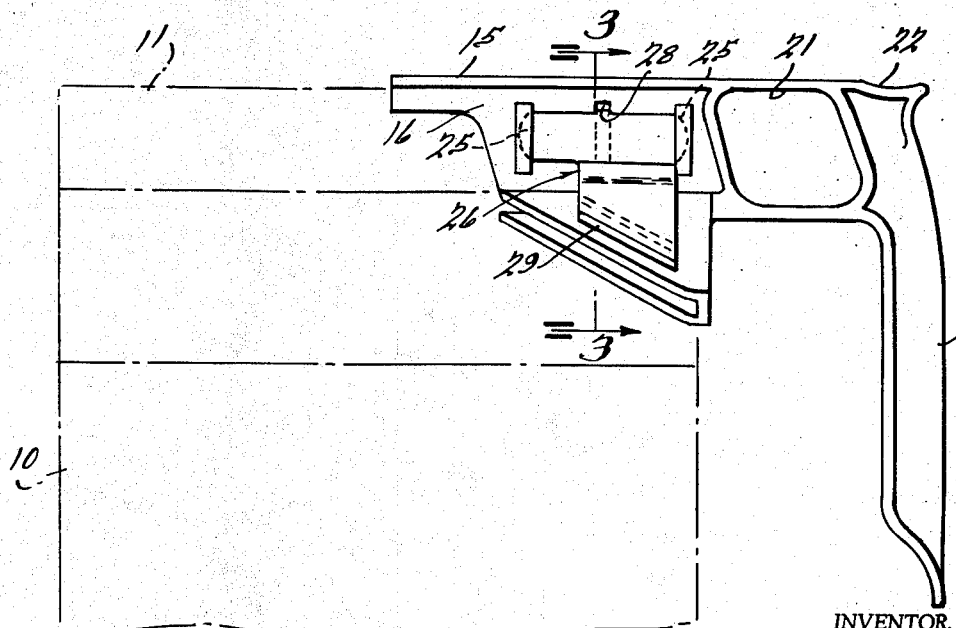
FIGURE 2 is an enlarged side elevational view of the device attached to a conventional milk carton, the milk carton being partially indicated in phantom lines.
Figure 3:
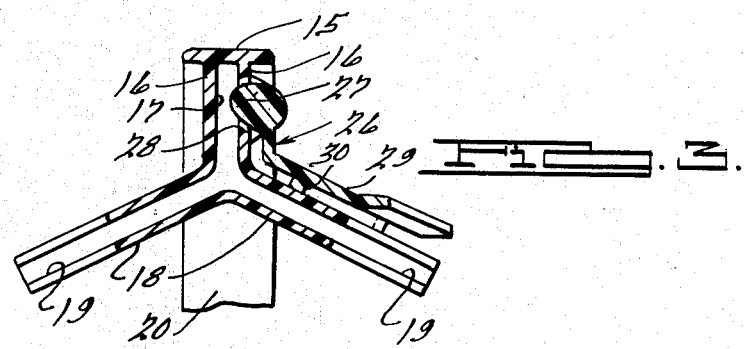
FIGURE 3 is a sectional elevational view taken substantially on the plane indicated by line 3—3 in FIGURE 2.

In FIGURES 1 and 2 of the drawings, there is illustrated a milk carton 10 of the conventional type having a top fold 11 and angular or triangular end folds 12.

The handle consists of a body portion 15 provided with two spaced parallel walls 16 forming a horizontal vertically extending channel 17 adapted to engage the top fold 11 of the carton. The reference character 18 indicates a pair of oppositely extending, angularly arranged members provided with channels 19 adapted to engage the triangular folds 12 of the carton.

Attached to the end of the body portion 15 of the handle device is a handle portion 20 which projects downwardly from the body portion at a substantially right angle thereto. This handle is provided with a finger opening 21 and a thumbrest 22 so that the handle 20 may be grasped by the second, third and fourth fingers of the hand, with the first finger extending through the finger opening 21 and the thumb engaging the thumbrest 22. Thus, the handle device may be firmly and conveniently grasped by the user.

Rotatably mounted as at 25 on one of the walls 16 is a clamping device 26. This clamping device is provided with a locking cam 27 which projects through an aperture 28 in one of the sidewalls 16, so that when the cam is rotated to locking position, it will forcibly engage the top fold 11 of the carton to clamp the same in the channel 17. A finger piece 29 is secured to the locking device 26 to rotate the locking cam 27 from its operative to its inoperative position. When the locking cam 27 is in its operative position, the finger piece 29 is located in a position parallel with the adjacent angularly extending member 18 and is spaced therefrom by means of a spacing lug 30 so that it may be readily grasped.

From the structure thus far described, it will be apparent that with the finger piece 29 raised and the locking cam 27 in its inoperative position, the device may be slipped onto the carton with the channel 17 of the body portion 15 engaging the top fold 11 and with the laterally extending channel-shaped portions 18 engaging the triangular folds 12 of the carton. This is the position illustrated in FIGURES 1 and 2. The finger piece 29 is then rotated to cause the locking cam 27 to enter the slot 28 and engage the top fold 11 to secure the handle device to the carton. As previously described, the handle is so constructed that it may be readily grasped with the second, third and fourth fingers, with the first finger extending through the finger opening 21 and with the thumb resting on the thumbrest 22. Thus, the carton 10 may be readily maneuvered to pour out its contents.

Figure 4:
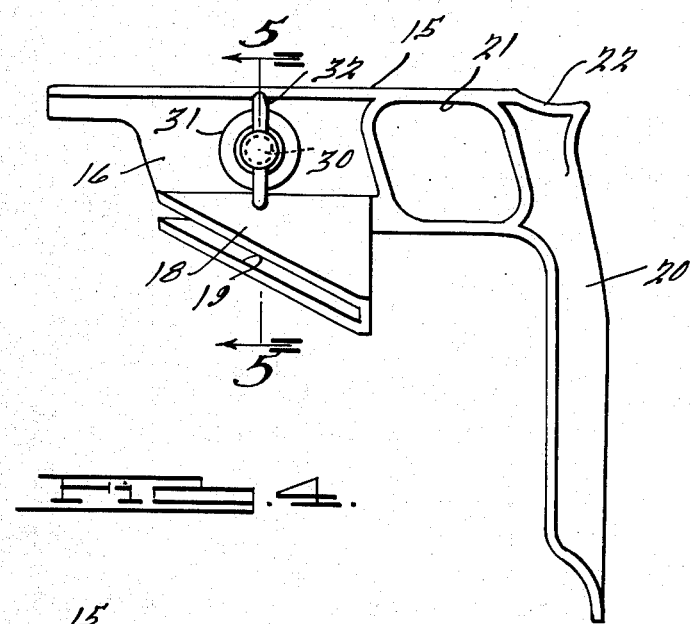
FIGURE 4 is a side elevational view of a slightly modified form of construction.
Figure 5:
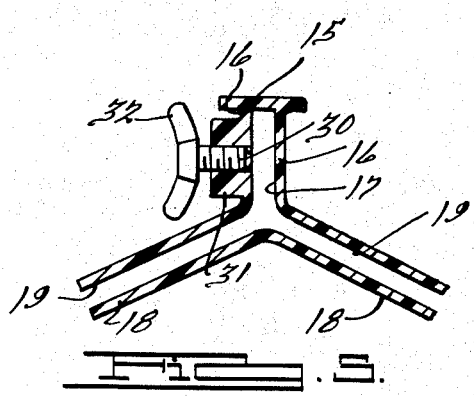
FIGURE 5 is a sectional elevational view taken substantially on the plane indicated by line 5—5 in FIGURE 4.

In FIGURES 4 and 5, a slightly modified form of construction is illustrated in which a different type of locking means is provided. This locking means consists of a set screw 30 threadedly engaging a boss 31 in one of the walls 16 of the channel 17 of the body portion 15 of the handle device. The set screw 30 is provided with a finger piece 32 so that the set screw may be manipulated to project the inner end thereof into the channel 17 to engage the top fold 11 of the carton and thus secure the handle device to the carton.

The structures just described are so reduced in the number and character of their component parts as to approach the ultimate in structural simplicity. Therefore, the device may be conveniently made of any suitable plastic by molding the same. The structural simplicity of the device creates an economy in its manufacture and maintenance.

While two commercially practical embodiments of the invention have been described and illustrated herein somewhat in detail, it will be understood that various changes may be made as may come within the purview of the accompanying claims.

What is claimed is:

1. A handle device for milk cartons and the like of different sizes having a top fold and triangular end folds, said handle device comprising, a body portion formed with an elongated upper channel embracing said top fold throughout a substantial portion thereof, a pair of oppositely extending, angularly arranged channel-shaped portions embracing said triangular end folds, a handle portion depending from one end of said body portion, and a clamping device rotatably mounted on one side of said upper channel of the body portion, said clamping device comprising a locking cam extending through an aperture in said upper channel, and a finger piece connected to said clamping device for rotating the same to move said locking cam into engagement with said top fold to secure said handle device to said carton.

2. A device as described in claim 1 in which said handle portion has a finger opening extending therethrough at the juncture of said body and handle portions and a thumbrest on the edge of said body portion.

3. A handle device for milk cartons and the like of different sizes having a top fold and triangular end folds, said handle device comprising, a body portion formed with an elongated upper channel embracing said top fold throughout a substantial portion thereof, pair of oppositely extending, angularly arranged channel-shaped portions embracing said triangular end folds, a handle portion depending from one end of said body portion, and a clamping device mounted on one side of said upper channel of the body portion, said clamping device comprising a set screw rotatably mounted on the upper channel and extending into the channel-shaped portion thereof to engage said top fold to secure said handle device to said carton.

References Cited by the Examiner

UNITED STATES PATENTS

| | | | |
|---|---|---|---|
| 1,081,344 | 12/13 | Tink | 294—27 |
| 1,406,811 | 2/22 | Bachrik | 294—27 |
| 3,017,215 | 1/62 | Galipeau. | |
| 3,028,647 | 4/62 | Greenberg. | |

SAMUEL F. COLEMAN, *Primary Examiner.*

ANDRES H. NIELSEN, *Examiner.*